US012700395B2

(12) United States Patent
Izzo et al.

(10) Patent No.: US 12,700,395 B2
(45) Date of Patent: Aug. 4, 2026

(54) MOTOR VEHICLE PROVIDED WITH A SOUND GENERATION AERODYNAMIC APPARATUS

(71) Applicant: FERRARI S.P.A., Modena (IT)

(72) Inventors: Stefano Izzo, Modena (IT); Antonio Palermo, Modena (IT); Marco Ballatore, Modena (IT)

(73) Assignee: FERRARI S.P.A. (IT)

( * ) Notice: Subject to any disclaimer, the term of this patent is extended or adjusted under 35 U.S.C. 154(b) by 168 days.

(21) Appl. No.: 18/636,679

(22) Filed: Apr. 16, 2024

(65) Prior Publication Data

US 2024/0355316 A1 Oct. 24, 2024

(30) Foreign Application Priority Data

Apr. 20, 2023 (IT) ........................ 102023000007728

(51) Int. Cl.
*G10K 15/04* (2006.01)
*G10K 5/00* (2006.01)
*H04R 3/04* (2006.01)

(52) U.S. Cl.
CPC ............... *G10K 15/04* (2013.01); *G10K 5/00* (2013.01); *H04R 3/04* (2013.01); *H04R 2430/01* (2013.01); *H04R 2499/13* (2013.01)

(58) Field of Classification Search
CPC .......... G10K 15/04; G10K 5/00; G10K 15/02; H04R 3/04; H04R 2430/01; H04R 2499/13; B60Q 5/008; B60Q 5/00; H04B 1/082
USPC ................................. 381/71.4, 86, 302, 389
See application file for complete search history.

(56) References Cited

U.S. PATENT DOCUMENTS

| | | | | |
|---|---|---|---|---|
| 10,011,224 B2 * | 7/2018 | Chang | ...................... | H04R 3/04 |
| 11,872,936 B2 * | 1/2024 | Noh | ...................... | B60Q 5/005 |
| 12,344,164 B2 * | 7/2025 | Oliva | ...................... | G10K 11/04 |
| 2009/0277707 A1 * | 11/2009 | Ballard | ...................... | F04D 25/06 340/384.3 |
| 2011/0010269 A1 * | 1/2011 | Ballard | ............. | G06Q 30/0601 705/26.1 |

(Continued)

FOREIGN PATENT DOCUMENTS

JP 2006347368 A 12/2006

OTHER PUBLICATIONS

Search Report issued in Italian Patent Application No. 102023000007728.

*Primary Examiner* — Xu Mei
(74) *Attorney, Agent, or Firm* — The Belles Group, P.C.

(57) ABSTRACT

A motor vehicle comprising a sound emitting instrument for emitting sound comprising an aerophone instrument is disclosed. The aerophone instrument is arranged so as to be constantly invested by an aerodynamic flow corresponding to a forward motion of the motor vehicle, whereby the aerophone instrument is configured to emit at least part of said sound passively through the aerodynamic flow, and an active device configured to actively control at least one property of the sound, characterized by comprising a control apparatus, in turn comprising a mapping to associate a speed of the motor vehicle with a desired value of a variable corresponding to the property, the control apparatus being configured to determine the speed of the motor vehicle, and control the active device as a function of the desired value according to a control law to reduce a deviation between an actual value of the variable and the desired value.

20 Claims, 10 Drawing Sheets

(56) References Cited

U.S. PATENT DOCUMENTS

| | | | | |
|---|---|---|---|---|
| 2013/0033374 | A1* | 2/2013 | Nakajima | B60W 10/06<br>340/466 |
| 2016/0311368 | A1 | 10/2016 | Lee | |
| 2023/0356656 | A1* | 11/2023 | Palmieri | G10K 15/02 |

* cited by examiner

MOTOR VEHICLE PROVIDED WITH A SOUND GENERATION AERODYNAMIC APPARATUS

CROSS-REFERENCE TO RELATED APPLICATION

This patent application claims priority from Italian patent application no. 102023000007728, filed on Apr. 20, 2023, the entire disclosure of which is incorporated herein by reference.

TECHNICAL FIELD

The invention relates to a motor vehicle and in particular to the control of the sounds emitted by the motor vehicle.

BACKGROUND

The sound perceived by the driver inside the passenger compartment of a motor vehicle is certainly an important aspect in the field. In fact, a component which cannot be disregarded in the overall judgment of a motor vehicle is the quality of the emitted sound, especially in terms of pleasantness of the sound and of the involvement of the driver with respect to the actual operating conditions of the motor vehicle. The motor vehicles provided with internal combustion engines produce sounds in large part produced by the same engines through the exhausts. In the case of a motor vehicle having only electric propulsors, the emitted sound is substantially produced by aerodynamic swooshing and by the rolling of the tyres, since the sound generated by the electric propulsors is almost inaudible and generally also little appreciated. Consequently, the driver does not receive a clear sound response with respect to the actual operating conditions of the motor vehicle. Therefore, the need is felt for a motor vehicle which can emit suitable sounds with respect to the expectations of the driver and of the possible passengers. Furthermore, the need is also felt for the emitted sounds to be sufficiently referable to the operating conditions of the motor vehicle, so that the driver has a greater control of the motor vehicle and a greater driving awareness.

An object of the invention is to satisfy at least one of the needs set forth above, preferably in a simple and repeatable manner.

DESCRIPTION OF THE INVENTION

In one aspect, the invention can be a motor vehicle comprising a sound emitting instrument for emitting sound, the sound emitting instrument comprising an aerophone instrument arranged so as to be constantly invested by an aerodynamic flow corresponding to a forward motion of the motor vehicle, wherein the aerophone instrument is configured to emit at least part of said sound passively through the aerodynamic flow, an active device configured to actively control at least one property of the sound, and a control apparatus comprising a mapping to associate a speed of the motor vehicle with a desired value of a variable corresponding to said property, the control apparatus being configured to: determine the speed of the motor vehicle, determine the desired value of the variable by applying the mapping to the determined speed, and control the active device as a function of the desired value according to a control law to reduce a deviation between an actual value of the variable and the desired value.

In one aspect, the invention can be a motor vehicle comprising a sound emitting instrument configured to emit sound, the sound emitting instrument comprising an aerophone instrument arranged so as to be invested by an air flow corresponding to a forward motion of the motor vehicle, wherein the aerophone instrument is configured to emit at least part of said sound passively through the air flow, an active device configured to actively control a property of said sound, and a control apparatus comprising a mapping to associate a speed of the motor vehicle with a desired value of a variable corresponding to said property, the control apparatus being configured to determine the speed of the motor vehicle, determine the desired value of the variable using the mapping and the determined speed, and control the active device as a function of the desired value according to a control algorithm to adjust a deviation between an actual value of the variable and the desired value of the variable.

In one aspect, the invention can be a sound emitting instrument for use with a motor vehicle, the sound emitting instrument being configured to emit sound and comprises an aerophone instrument arranged so as to be invested by an aerodynamic flow corresponding to a forward motion of the motor vehicle, wherein the aerophone instrument is configured to emit at least part of said sound through the aerodynamic flow, an active device configured to actively control a property of said sound, and a control system in communication with the active device, wherein the control system is adapted to determine the speed of the motor vehicle, associate the determined speed of the motor vehicle with a desired value of a variable corresponding to said property of said sound, and control the active device as a function of the desired value according to a control law to reduce a deviation between an actual value of the variable and the desired value of the variable.

BRIEF DESCRIPTION OF THE DRAWINGS

The invention will now be described with reference to the accompanying drawings, which illustrate some exemplifying and non-limiting embodiments thereof, wherein.

DETAILED DESCRIPTION OF THE INVENTION

Figure 1:
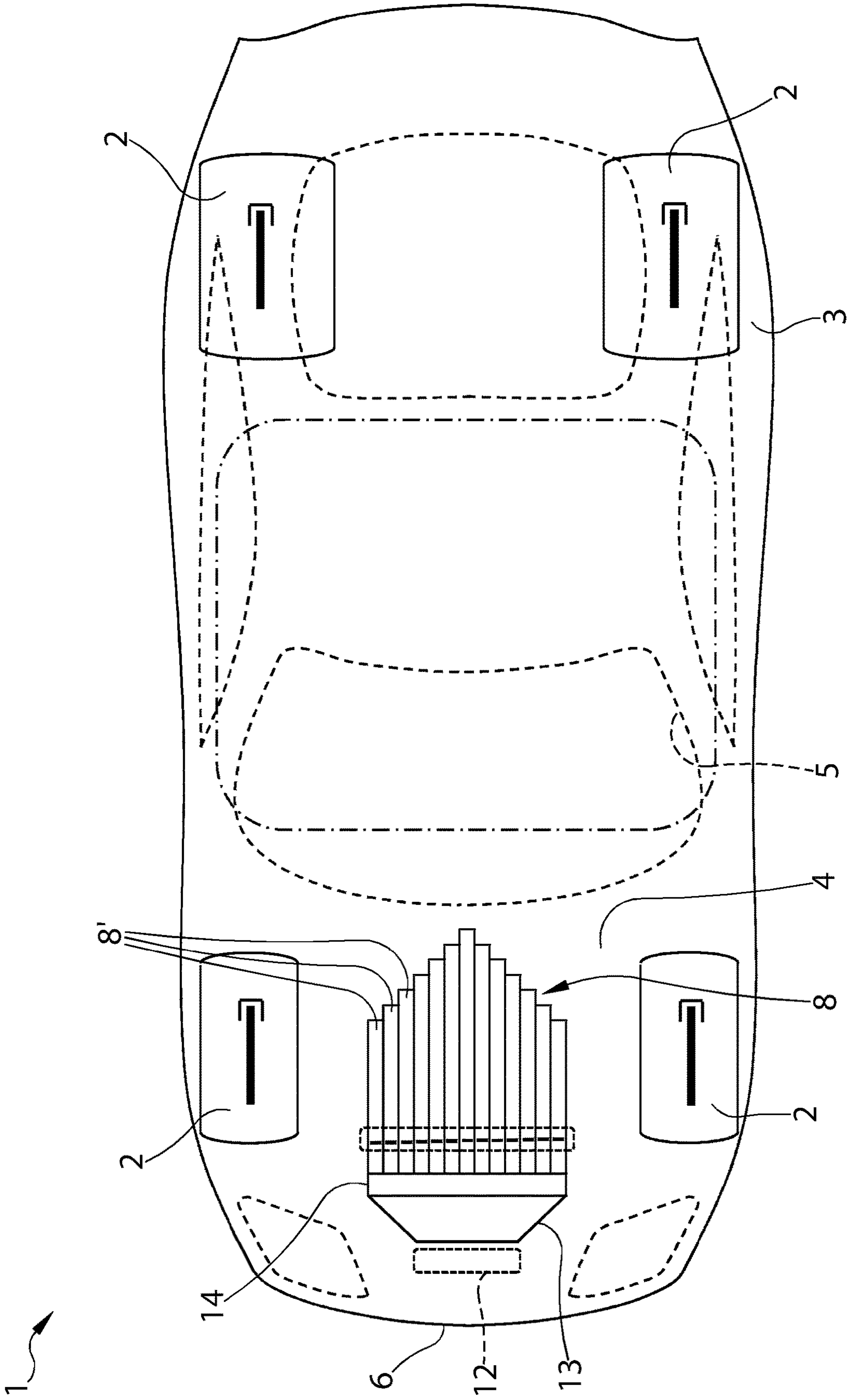
FIG. 1 is a schematic view of a motor vehicle according to the invention provided with an aerodynamic sound emitting instrument.

In FIG. 1, reference numeral 1 indicates, as a whole, a motor vehicle comprising a chassis, which supports (through corresponding suspensions) a plurality of wheels 2, of which two front wheels and two rear wheels.

For example, at least two of the wheels 2, for example the rear ones and/or the front ones receive a torque from an electric propulsion device (i.e. having only electric motors, for example one or more electric motors).

The chassis is covered by a bodywork 3 defining a passenger compartment containing at least two seats for accommodating respective occupants, for example a driver and a passenger.

The bodywork 3 comprises, among the other things, a front bumper 6, a front hood 4, and a windshield 5 which delimits the passenger compartment at the front.

Laterally, the bodywork 3 has two body sides provided with respective doors, each of which is equipped with a respective openable window.

The motor vehicle 1 further comprises a bottom wall (not illustrated), which in use faces a road surface and is connected to the bodywork 3. In other words, the bodywork 3 develops upwards from the bottom wall.

The motor vehicle 1 comprises a sound emitting instrument 7 (FIGS. 10, 11, 12) for generating sound through a forward wind, i.e. the motion of the air with respect to the motor vehicle 1 generated by the forward motion of the motor vehicle 1 (the forward wind is null when the motor vehicle 1 is stationary and is all the more intense the greater the forward speed or more simply the speed of the motor vehicle 1).

In other words, the forward wind is an aerodynamic flow generated by the forward motion of the motor vehicle 1 and thus corresponding to such forward motion.

The instrument 7 comprises at least one aerophone instrument 8, i.e. an instrument in which the air is the primary sound emitting means. In other words, the aerophone instrument 8 is an instrument capable of making an air flow vibrate, thus generating a sound through the vibration of the air flow.

In the non-limiting example of FIG. 1, the motor vehicle 1 comprises a plurality of aerophone portions 8' (in turn defining respective aerophone instruments) arranged in parallel side by side and inside which part of the forward wind is conveyed.

In other words, the forward wind is utilized for activating (exciting) the aerophone portions 8'.

Each aerophone portion 8' is arranged so as to be invested, in particular constantly, by the forward wind.

Each aerophone portion 8' is configured to emit at least a part of the sound emitted by the instrument 7 passively through the forward wind.

In general, also one single aerophone portion 8' can form the aerophone instrument 8.

In particular, the aerophone portions 8' are of resonant type (resonant aerophones) since the vibrating air is contained in a cavity of the aerophone instrument 8 or more precisely of the aerophone portion 8', more in particular defined by a tubular body 9 of the aerophone instrument 8 or more precisely of the aerophone portion 8'.

Each of the aerophone portions 8' has its tubular body 9, which is shaped in particular like an organ pipe, although the shape could generally be different, as long as the shape is adapted for making the air or the air flow passing through the tubular body 9 resonate.

Figure 2:
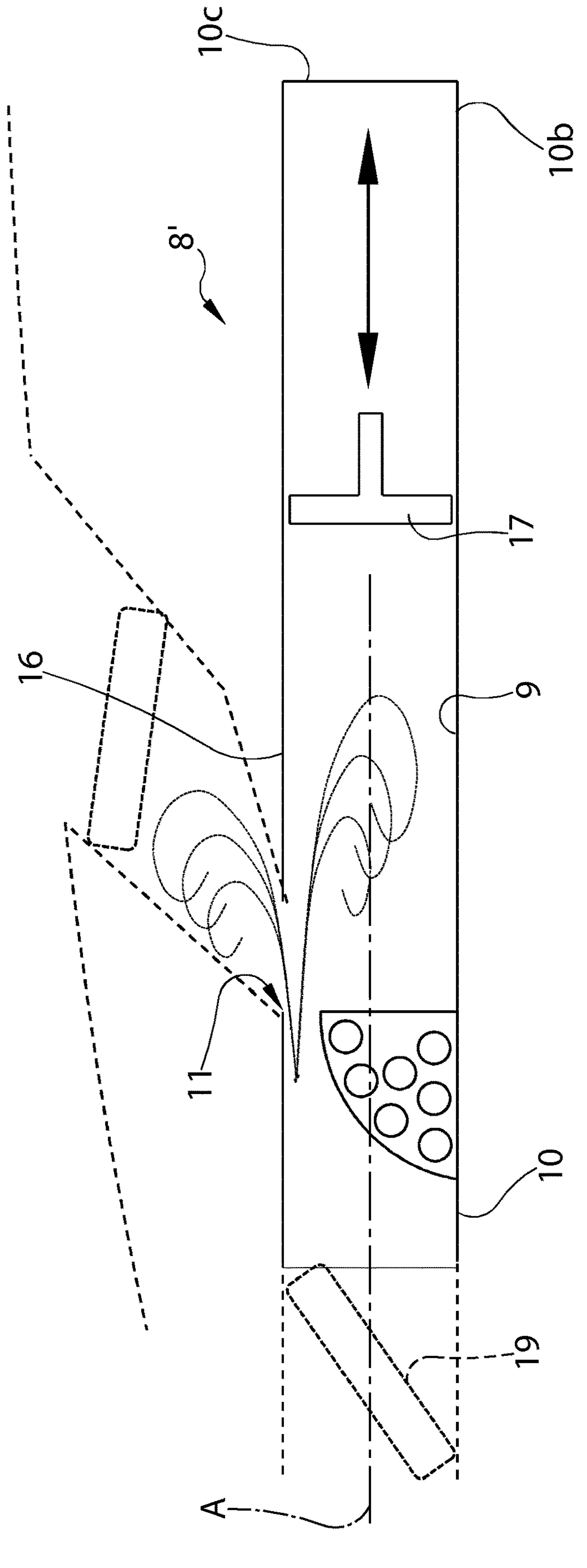
FIG. 2 is a schematic view of a possible pipe of the aerodynamic sound emitting instrument of FIG. 1.

According to what is illustrated in FIG. 2, the tubular body 9 of the relative aerophone portion 8' (namely of the relative organ pipe) has an open end 10, i.e. an end having an inlet opening.

The end 10, or more precisely the inlet opening thereof, is arranged so as to be exposed to the forward wind, for example directly or also indirectly through possible devices adapted to convey the forward wind towards the end 10.

In this manner, the tubular body 9 takes in at least a portion of the forward wind through the end 10, more in particular through the inlet opening thereof.

The tubular body 9 extends along an axis A, in this case rectilinear, although the axis A could also be curvilinear according to embodiments not illustrated.

Still with reference to FIG. 2, the tubular body 9 has an end **10*b* opposite the end 10 according to the axis A. The end 10*b* is closed, in particular by means of a closing wall 10*c*, so as to prevent the taken in portion of the forward wind from escaping through the end 10*b***.

Figure 4:
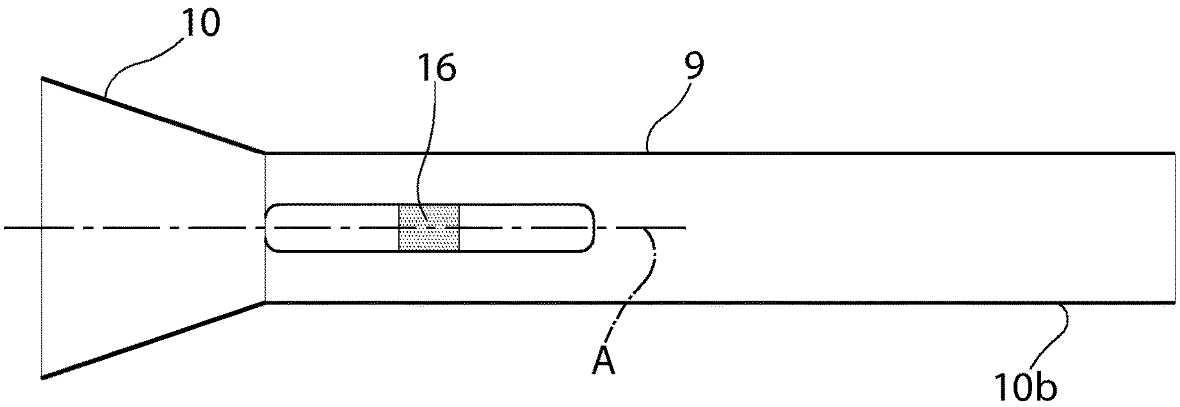
FIG. 4 illustrates a still more schematized shape of the pipe of FIG. 2, and in which both ends of the pipe are open.

For other tubular bodies 9, different from the one specifically illustrated in FIG. 2, the end **10*b* could be open like the end 10, so as to have in particular an outlet opening (FIG. 4**).

Still with reference to FIG. 2, the tubular body 9 laterally has an outlet opening 11 (also called "mouth"). In use, the air is introduced inside the tubular body 9 through the inlet opening 10 and exits the tubular body 9 through the outlet opening 11; in this passage, the particular inner shape of the tubular body 9 makes the air which is inside the tubular body 9 vibrate, generating a sound, the intensity of which specifically depends on the diameter (width, more in general) of the tubular body 9 and on the air flow rate passing through the tubular body 9.

The frequency of the sound specifically depends on the length (along the axis A) of the tubular body 9.

In particular, the aerophone instrument 8 or the aerophone portion 8' comprises a wedge-shaped core or labium 16 at the outlet opening 11. The core 16 extends in a wedge-shaped manner towards the direction of the air flow rate or air flow for dividing the air flow rate between the inside of the tubular body 9 towards the end **10*b* and the outside of the tubular body 9 through the outlet opening 11**.

Therefore, in this case, the organ pipe is said to be a core triggering pipe. However, this is not strictly limiting, since the organ pipe could for example be a reed triggering pipe.

According to what is illustrated in FIG. 1, the motor vehicle 1 comprises an air intake 12 which is configured to intercept part of the forward wind and a supply duct 13 which originates from the air intake 12 and leads to the ends 10 of the aerophone portions 8'.

In the embodiment illustrated in FIG. 1, the air intake 12 is obtained through the bodywork 3, namely is substantially a "hole" of the bodywork 3.

Preferably, the supply duct 13 puts the outside of the motor vehicle 1 in communication with a manifold 14 of the motor vehicle 1, in turn communicating with the inlet openings of the ends 10.

The tubular bodies 9 are arranged inside a protective casing (not illustrated), which is preferably insulated with respect to the manifold 14.

Therefore, the inside of the protective casing receives air from the outlet openings 11, but not directly from the manifold 14.

In this manner, the forward wind travels on the inside of the tubular bodies 9, but does not lap the tubular bodies 9 from the outside. This favours a correct emission of the sound through the aerophone instrument 8.

In turn, the casing then communicates with a vent obtained on the bodywork 3, for example on the back of the motor vehicle 1 so as not to be exposed to the forward wind.

According to what is illustrated in FIG. 2, the aerophone instrument 8 or the aerophone portion 8' comprises an adjustable element 17, in particular comprising the end 10*b*, of which the wall 10*c* is preferably part.

In other words, the adjustable element 17 is specifically part of the aerophone instrument 8.

The adjustable element 17 is movable along the axis A so as to vary or alter the length of the tubular body 9, in particular so as to vary the frequency of the sound generated by the aerophone instrument 8 or by the aerophone portion 8'.

Figure 6:
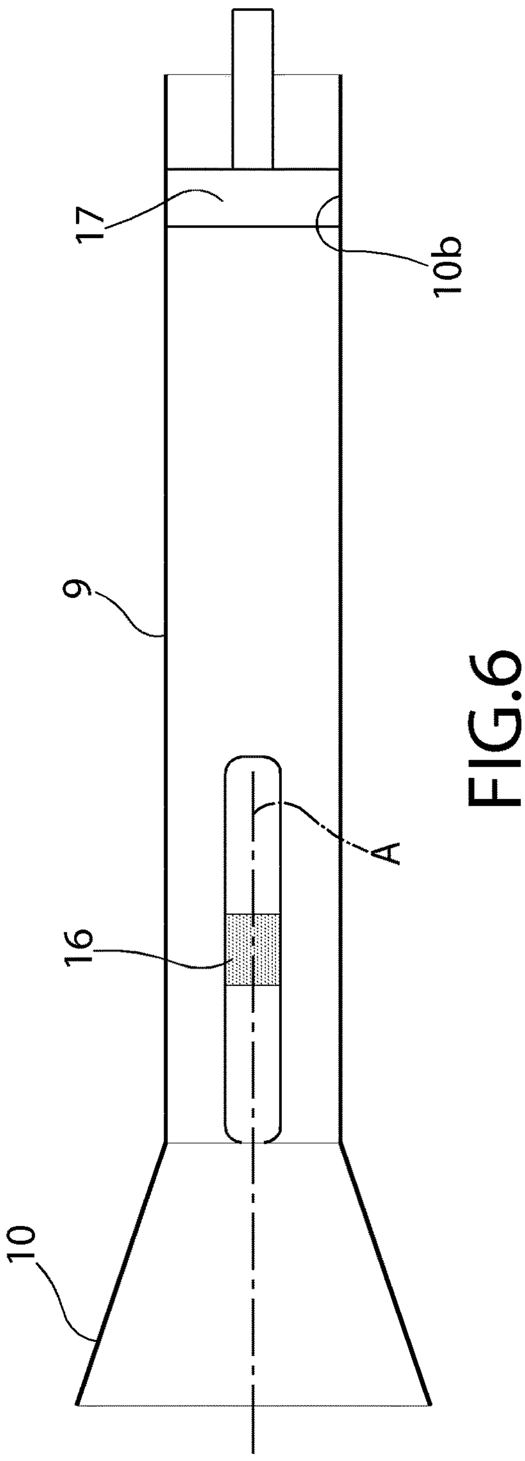

For example, as in the embodiment of FIG. 6, the adjustable element 17 can comprise an axially movable piston inside the tubular body 9 so as to vary or alter the length of the tubular body 9 and thus vary the frequency of the sound generated by the vibration of the air on the inside thereof (the greater the length of the volume of air vibrating, the greater the wavelength of the sound and thus the lower the frequency of the sound generated by the vibration of the air).

Figure 5:
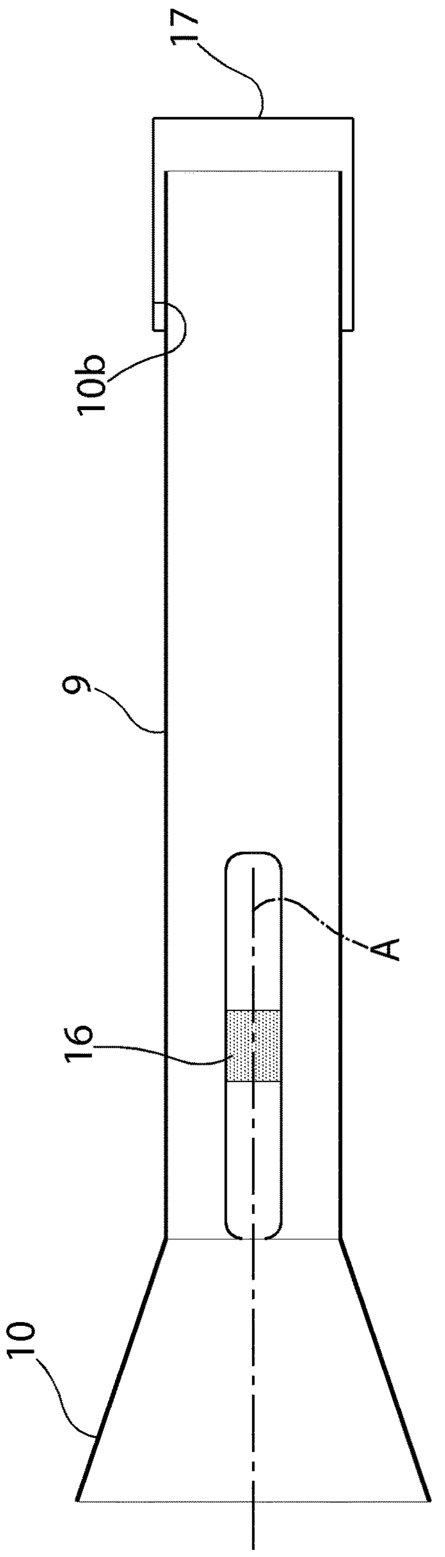
FIGS. 5 and 6 show the pipe of FIG. 4 with respective adjustable elements for closing one of the ends of the pipe also adjusting the axial length of the pipe.

Alternatively, as in the embodiment of FIG. 5, the adjustable element 17 comprises an internally threaded cap axially movable for being screwed on a thread obtained externally on the tubular body 9.

According to another alternative not illustrated, the adjustable element 17 also could have been, for example, an axially movable screw for being screwed on an inner thread of the tubular body 9.

According to an example, only a part of the aerophone portions 8' has the adjustable element 17, whereas the remaining part of the aerophone portions 8' has the end 10*b* open.

Figure 10:
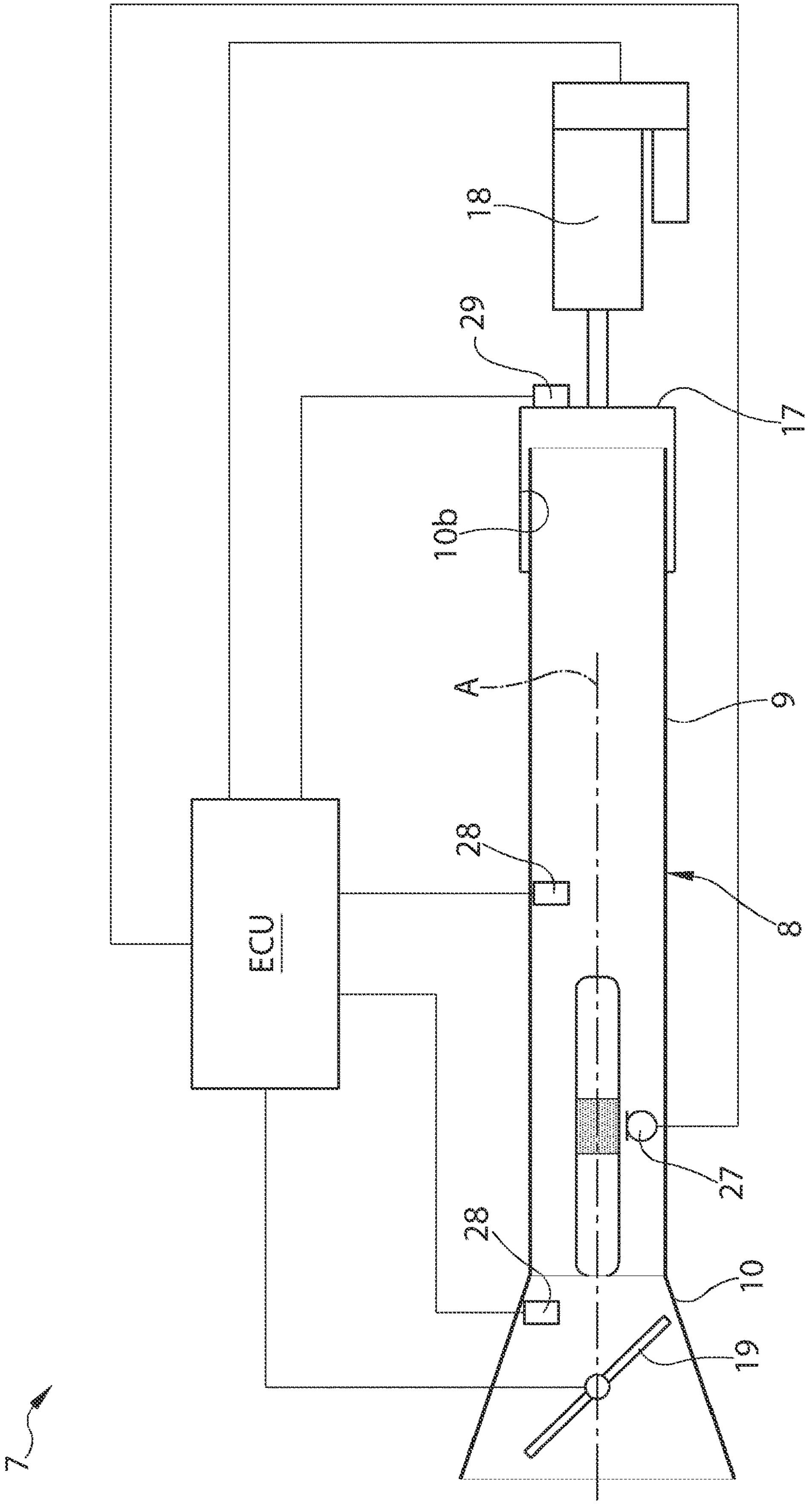
FIG. 10 is a scheme of the aerodynamic sound emitting instrument and of a relative control apparatus according to an embodiment of the invention.
Figure 11:
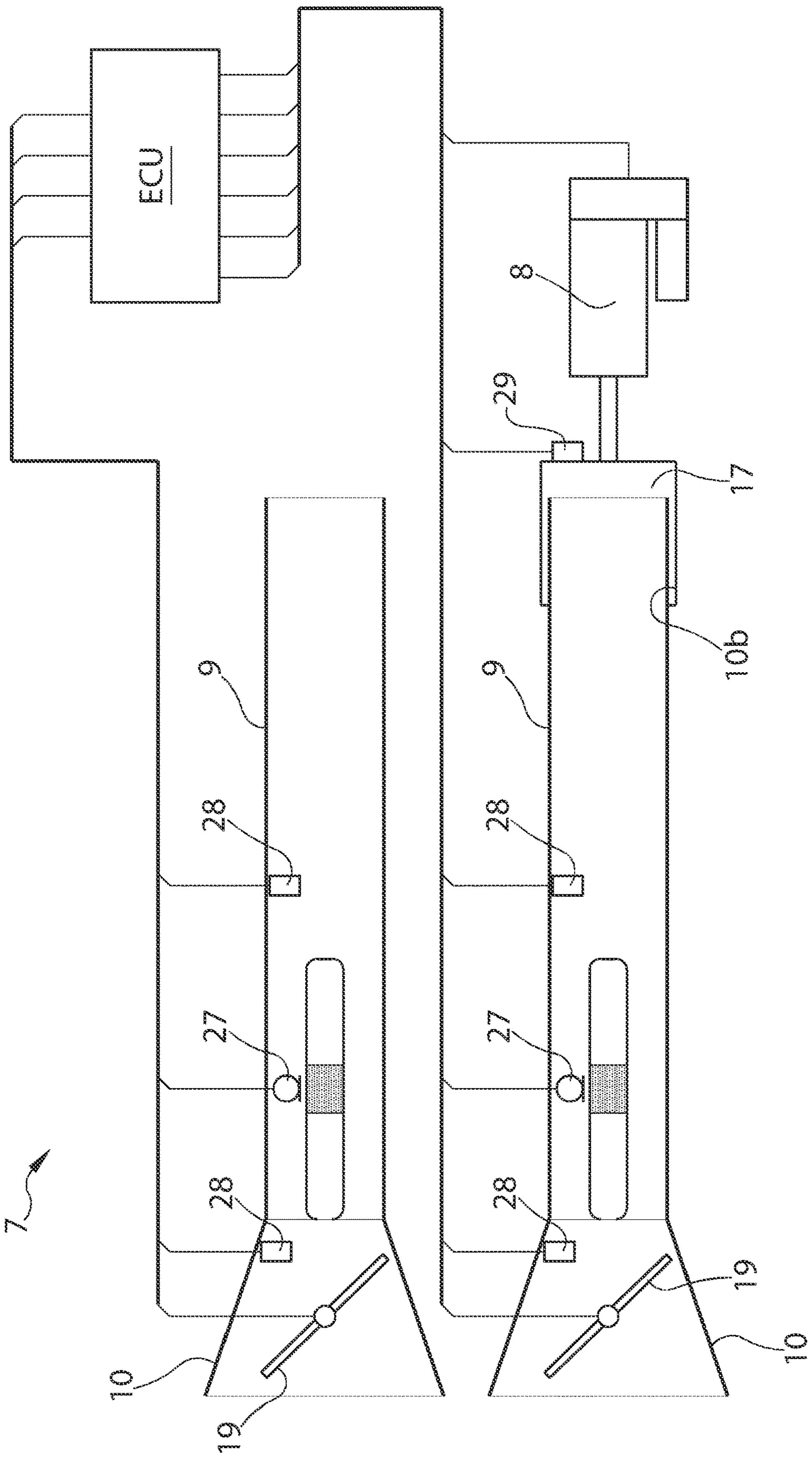
FIGS. 11-13 are schemes of the aerodynamic sound emitting instrument and of the relative control apparatus according to further respective embodiments of the invention.
Figure 12:
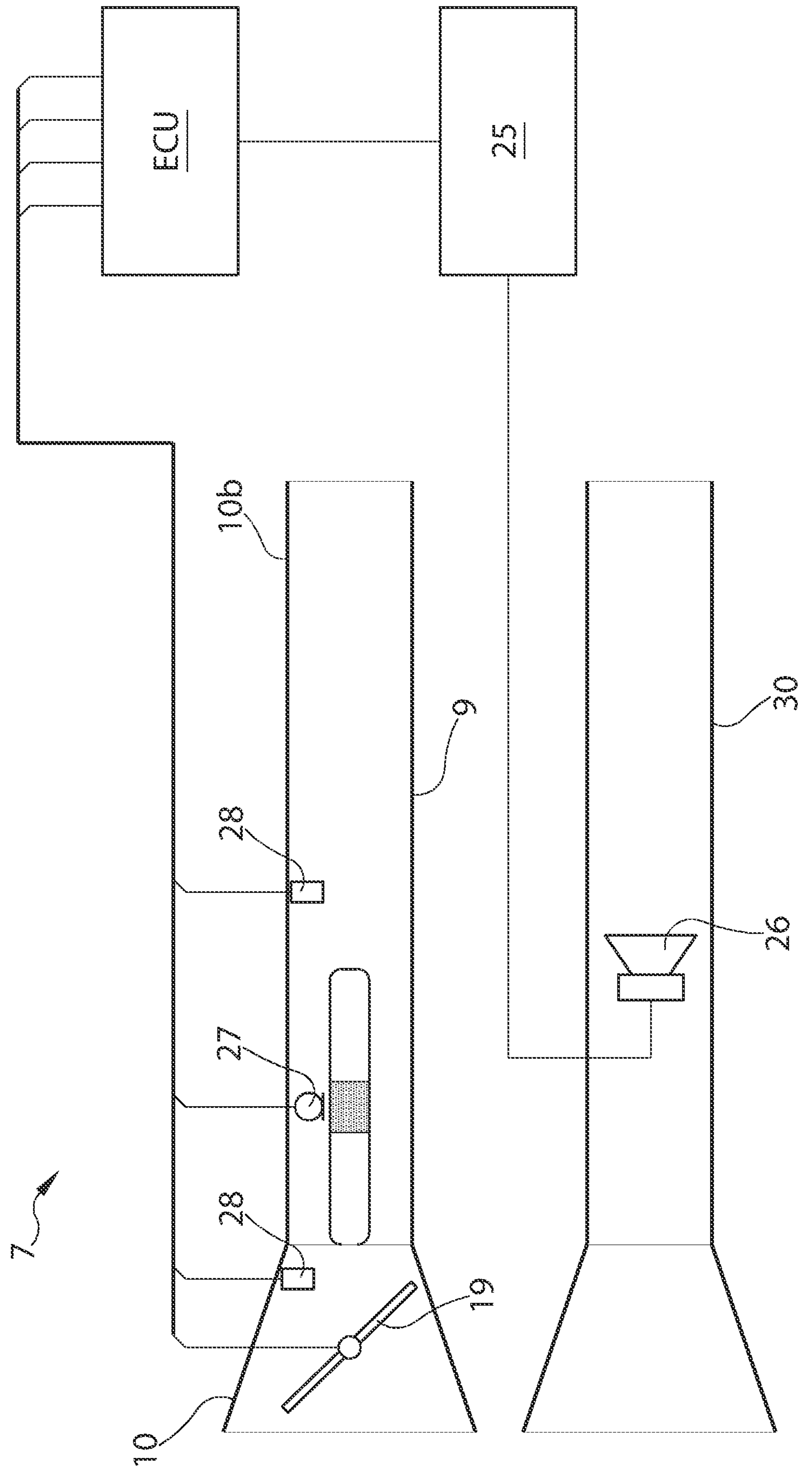

Conveniently, the shifting of the adjustable element 17 actively occurs through an electronically controlled actuator 18 (FIGS. 10, 11, 12).

According to what is illustrated in FIG. 2, the aerophone instrument 8 or the aerophone portion 8' comprises a valve 19, in turn defining or being part of an adjustable element of the aerophone instrument 8.

Preferably, the valve 19 is active and motorized.

More specifically, the valve 19 is arranged at the end 10 and is configured to choke the inlet opening of the end 10.

By varying the opening degree of the valve 19 it is possible to adjust the air flow rate taken in by the tubular body 9 and it is thus possible to adjust the intensity of the sound generated by the aerophone instrument 8 or by the aerophone portion 8'.

Therefore, more in general, the valve 19 is configured to adjust or influence fluidodynamic properties of the air taken in by the tubular body 9. The fluidodynamic properties include, for example, one or more among speed, flow rate, and pressure.

For example, each of the aerophone portions 8' is provided with the valve 19, but this is not essential, whereby also only a part of the aerophone portions 8' could be provided with the valve 19 or none of the aerophone portions 8' could be provided with the valve 19.

Based on the foregoing, the instrument 7 comprises at least one active device for actively controlling at least one property of the emitted sound.

In particular, the active device is configured to actively control the property of the emitted sound without introducing additional flows of fluid besides the aerodynamic flow generated by the forward motion of the motor vehicle 1.

For example, the active device comprises the adjustable element 17 for controlling the frequency of the sound.

Or, for example, the active device comprises the valve 19 as adjustable element for controlling the intensity of the sound.

In particular, the adjustable element is configured to adjust or alter a configuration of the tubular body 9, more in particular the length thereof or the width of a cross-section thereof.

More specifically, the frequency can here refer to the global frequency content of the sound, or to a fundamental frequency of the sound.

Figure 3:
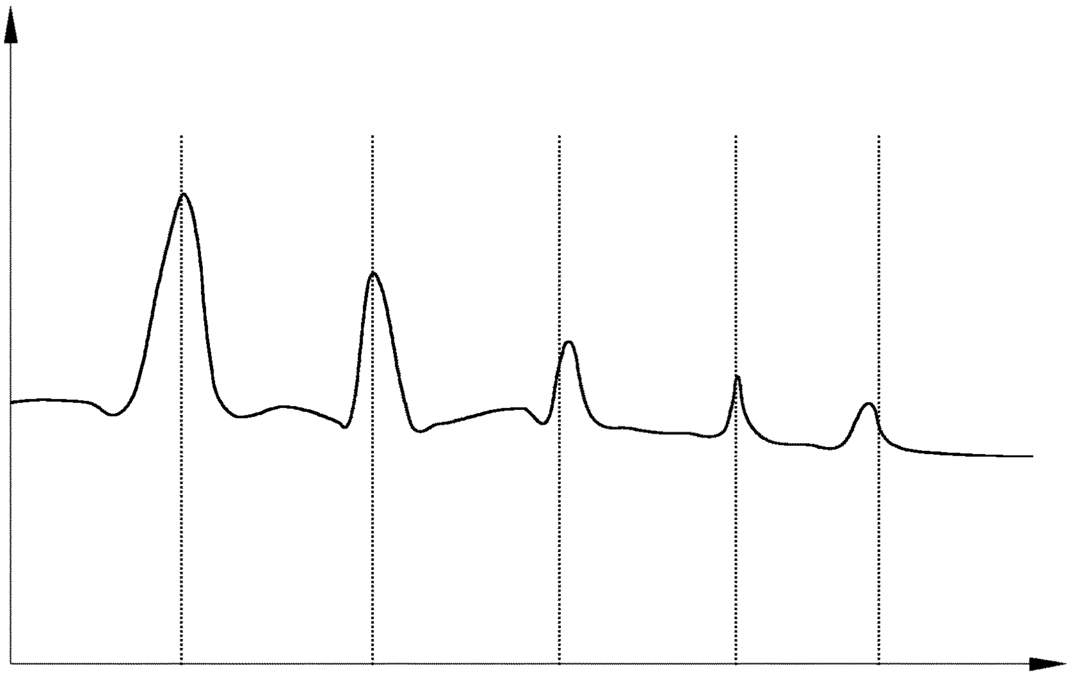
FIG. 3 is a graph illustrating a link between properties of a possible sound emitted by the pipe of FIG. 2.

In fact, FIG. 3 shows an example of properties of a sound emitted by the aerophone instrument 8. The graph of FIG. 3 has an abscissa representing the frequency of the sound and an ordinate representing the intensity or more precisely the sound pressure level of the sound.

The graph of FIG. 3 shows a plurality of intensity peaks at respective frequencies, the lowest of which is the fundamental frequency, corresponding to a higher intensity, whereas the other frequencies are integer multiples of the fundamental frequency with corresponding decreasing associated intensities.

Therefore, the fundamental frequency is characteristic of the entire frequency content of the sound.

In light of this, the term frequency can be understood in the following with the meaning of fundamental frequency of the sound. Likewise, the term intensity can be understood with the more specific meaning of sound pressure level, for example measured in decibel, whereby referred on a standard sound pressure reference.

On the basis of the examples indicated above (adjustable element 17 and valve 19), the property or properties controlled by the active device can be, for example, the frequency and/or the intensity of the sound emitted through the aerophone instrument 8.

Alternatively or additionally, the active device can even comprise an electrophone 25 provided with a loudspeaker 26 for emitting a sound, which can, for example, replace the sound of the aerophone instrument 8 or suitably integrate it.

Figure 13:
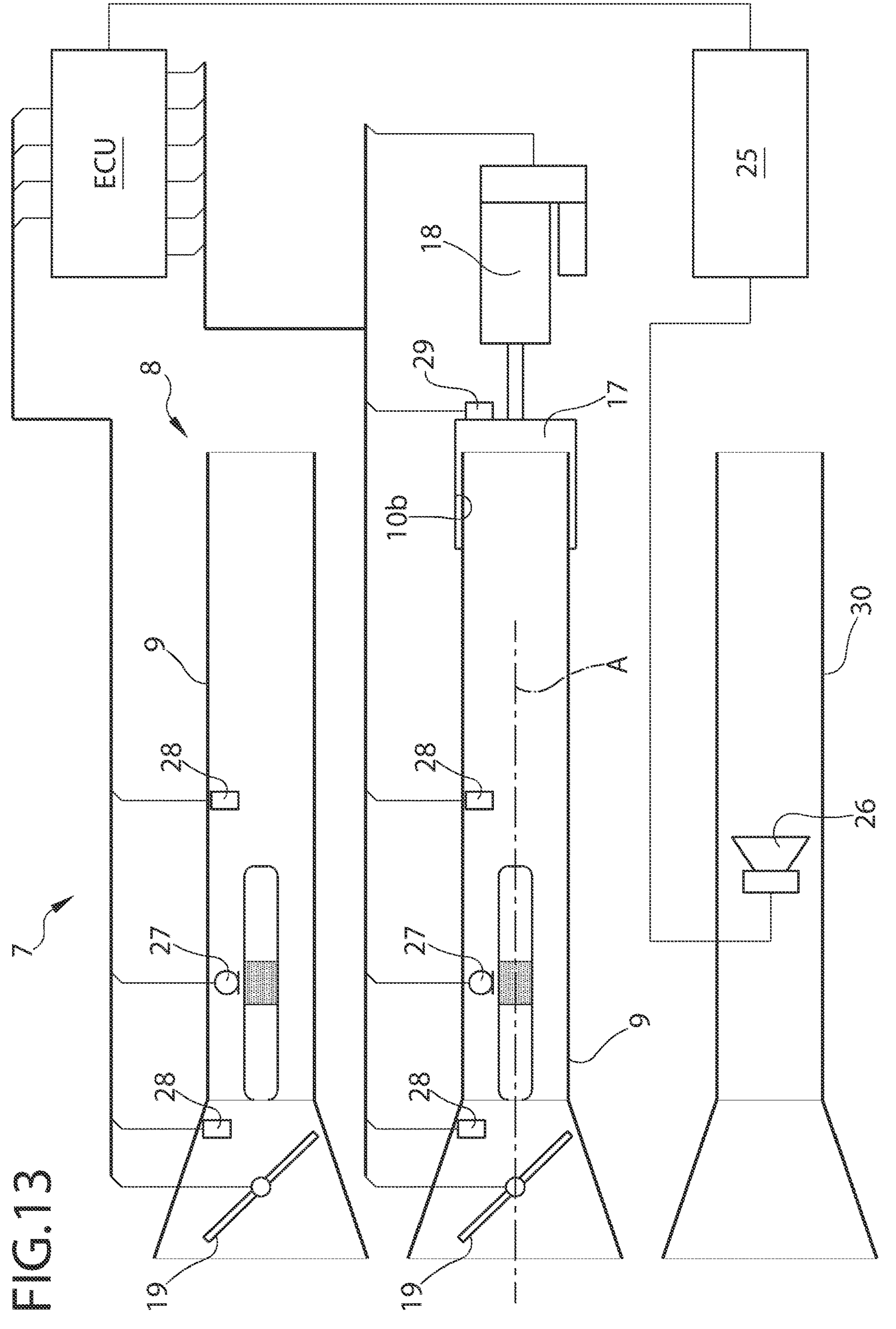

As is visible for example in FIGS. 12, 13, the loudspeaker 26 can be arranged inside a tubular body 30, in turn arranged parallel to one or more tubular bodies 9.

Unlike the tubular body 9, the tubular body 30 preferably does not have suitable characteristics for the emission of sound through the air passing through the tubular body 30. In other words, the tubular body 30 is part of or constitutes a support structure for supporting the loudspeaker 26.

The tubular body 30 is arranged parallel to or more precisely alongside the tubular body 9, so that the sound emitted by the loudspeaker 26 can be localized in the proximity of the aerophone instrument 8. Furthermore, in this manner, the tubular body 30 and the loudspeaker 26 can be placed inside the above-mentioned protective casing.

According to the invention, the motor vehicle 1 comprises a control apparatus comprising a mapping or function for associating a speed of the motor vehicle 1 (the forward speed) or a magnitude indicative thereof with a desired value of a variable corresponding to the property or properties controllable via the active device.

More specifically, the control apparatus comprises at least one control unit or processing unit or computation unit ECU, which stores or comprises the mapping.

The mapping can be a mathematical model, for example in analytical or closed form, or in form of table to be interpolated, or in form of experimental formula, without any loss of generality.

For example, the mapping can be obtained on the basis of experimental tests, or also only as a function of a target selected on the basis of the taste of a sample of motor vehicle drivers or on the basis of other requirements.

The variable can be a scalar variable, but not necessarily; the variable could also be a vector or matrix variable, for example for containing more scalar values corresponding to relative properties of the sound.

The control unit ECU is configured to determine the speed of the motor vehicle 1 or the magnitude indicative thereof.

In general, in the following, the term speed can be considered as the speed or the magnitude indicative thereof. Such consideration will also be valid for all of the other detected magnitudes which will be mentioned in the following.

For example, the control unit ECU can predict or observe the speed from an indication of the acceleration of the motor vehicle 1. In particular, the control unit ECU can receive, for example from a CAN (Controller Area Network) network of the motor vehicle 1, the indication relative to the acceleration of the motor vehicle 1.

From the indication of the acceleration, the control unit ECU obtains the speed, for example via a simple numerical calculation or via an observer of known type (e.g. Kalman filter).

Alternatively, the control apparatus can comprise one or more specific sensors for detecting the acceleration or the speed of the motor vehicle 1, so that the control unit ECU can determine the speed from the detections of the sensors.

Furthermore, the control unit ECU is configured to determine the desired value of the variable by applying the mapping to the determined speed.

Applying the mapping means associating the determined speed with the desired value according to the link established by the mapping.

Naturally, the control apparatus comprising the control unit ECU is configured to do everything for which the control unit ECU is in turn configured, in particular via the control unit ECU. The latter concept applies, for clarity, to the entire description.

Furthermore, the control unit ECU is configured to control the active device as a function of the desired value according to a control law for reducing a deviation or error between an actual value of the variable and the desired value.

In this manner, i.e. bringing the actual value of the variable towards the desired value, the control unit ECU and the active device control the properties of the sound.

Before the control, the actual value is the one resulting on the basis of the sound passively produced by the aerophone instrument 8 as a function of the forward wind. During the control, the actual value changes and could possibly be measured, for example, in real time.

The control law could even be, for example, an open-loop control law. This does not mean that the single components of the active device are actually controlled in open loop (for example actuators or valves of the active device could anyway be controlled according to closed control loops, in particular position control loops, speed control loops, control loops relative to operation variables, such as pressures, currents, voltages, on the basis of the type of operation of the actuators or of the valves), but specifically that the variable is controlled in open loop (in other words, control loops which are closed by a feedback of the variable corresponding to the property of the sound are not present).

In particular, the open-loop control law could be based on a relationship between the variable and an adjustment parameter of an adjustable element of the aerophone instrument 8 (for example the adjustable element 17 and/or the valve 19).

Therefore, via the relationship, the desired value of the variable will correspond to a desired value of the adjustment parameter.

For clarity, when not specified, the sole expression "desired value" will refer in all of the text of the description to the desired value of the variable; on the other hand, the expression "desired value of the adjustment parameter" will specifically refer to the adjustment parameter.

The adjustment parameter can be a scalar parameter, but not necessarily; in fact, the adjustment parameter could also be a vector or a matrix parameter or more in general a set of information, so as to comprise more scalar values, for example, relative to corresponding components of the adjustable element (for example the adjustable element 17 and the valve 19).

The adjustment parameter could belong to the field of real numbers, but also to the field of complex numbers, for example.

For example, a relationship between a variable and an adjustment parameter could be the relationship which links the length of the tubular body 9 to the frequency of the sound emitted by the aerophone instrument 8.

In particular, the relationship could be analytical and represented by the following equation $f=c/4L$, where f is the frequency, c the speed of the sound, and L the length of the tubular body 9. The relationship could also be experimental, i.e. built on the basis of experimental tests, as well as contain additional parameters (for example measurable via sensors) with respect to the adjustment parameter.

Here, the variable is a frequency variable (the variable f) corresponding to the frequency of the sound emitted by the aerophone instrument 8; the adjustment parameter is the length of the tubular body 9.

Therefore, the property here is the frequency, in particular the fundamental frequency.

Conveniently, in this case, the mapping associates the speed of the motor vehicle 1 with the desired value of the frequency variable according to a continuous function, in particular increasing, more in particular linear. In fact, a rise in the frequency upon the rising in the speed is desirable.

The adjustment parameter here relates to the adjustable element 17, since the movement of the adjustable element 17 along the axis A determines the length of the tubular body 9, i.e. the adjustment parameter.

Therefore, the adjustment parameter here is controllable or settable by the control unit ECU via the actuator 18, preferably via a closed-loop control. Therefore, the active device comprises the actuator 18, which is controllable for manipulating or controlling the adjustment parameter of the adjustable element 17, i.e. the length. For example, the length is controllable in closed loop via a closed-loop control of the position of the adjustable element 17 or of the actuator 18.

Another example of relationship could be the one between the air flow rate or the speed of the air through the tubular body 9 and the intensity of the sound emitted by the aerophone instrument 8.

Also here, the relationship could be expressed in analytical form, in form of table, and the like.

Figure 8:
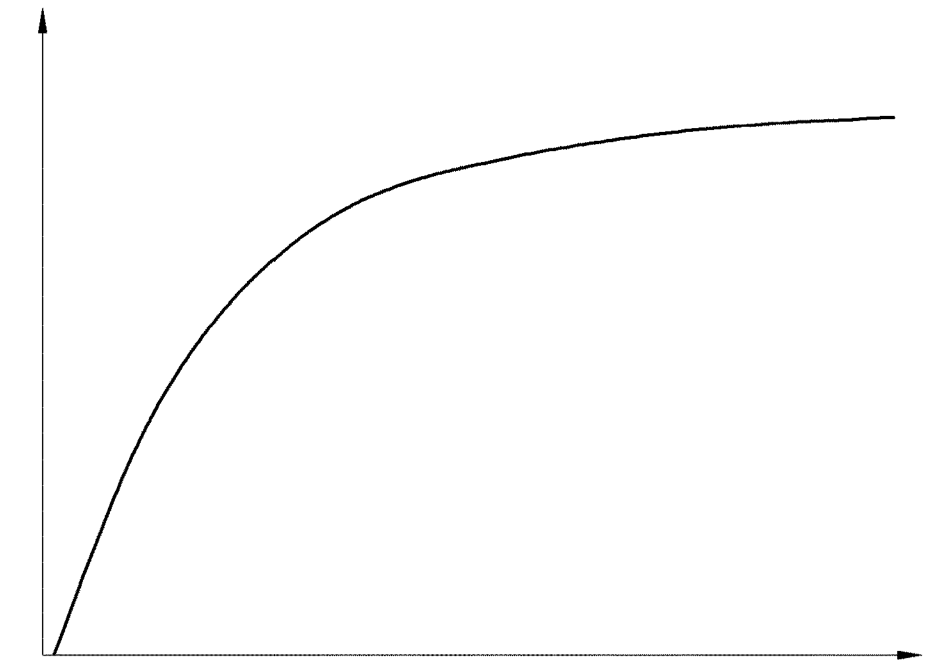
FIG. 8 is a graph representing a link between the speed of the motor vehicle and a sound pressure level of the sound emitted by the pipe.

For example, FIG. 8 expresses the relationship in the form of a graph having an abscissa representing the speed or the flow rate of the air through the tubular body 9 and an ordinate representing the intensity of the sound.

Here, the variable is an intensity or sound pressure variable corresponding to the intensity of the sound emitted by the aerophone instrument 8; the adjustment parameter is the opening degree of the inlet opening of the end 10. In fact, the opening degree influences the flow rate and the speed of the air.

Therefore, the property here is the intensity, in particular the sound pressure level.

Conveniently, in this case, the mapping associates the speed of the motor vehicle 1 with the desired value of the intensity variable according to a continuous function, in particular increasing, more in particular linear. In fact, a rise in the intensity upon the rising in the speed is desirable.

Summarizing, in general, the mapping associates the speed with the desired value according to a continuous function, in particular increasing, more in particular linear.

Therefore, the adjustment parameter here relates to the valve 19, because its operation determines the opening degree. In fact, in this description, the opening degree of the valve 19 will be considered a synonym of the opening degree of the inlet opening of the end 10.

Therefore, the adjustment parameter here is controllable or settable by the control unit ECU via the actuator of the valve 19, preferably in closed loop. Therefore, the active device comprises the actuator of the valve 19; the actuator of the valve 19 is controllable for manipulating or controlling the adjustment parameter of the valve 19, i.e. the opening degree. For example, the opening degree is controllable in closed loop via a closed-loop control of the position of the valve 19 or of the actuator thereof.

The adjustment parameters relative to the adjustment element 17 and to the valve 19 can also be considered joined in one single adjustment parameter, for example a vector parameter.

In light of what mentioned above, in general, the control unit ECU is configured to control the active device according to the aforementioned open-loop control law by setting the desired value of the adjustment parameter via the relative actuator, preferably via a closed-loop control.

Furthermore, the variable can also be controlled via the electrophone 25, alternatively or additionally, according to an open-loop control law.

Actually, the electrophone 25 could be controlled for directly emitting the sound with any desired property, in particular with one or more properties corresponding to the desired value of the variable.

Alternatively, the electrophone 25 could be controlled for emitting an integrative sound with respect to the one emitted by controlling the adjustment parameter, where the integrative sound summed to the one emitted by controlling the adjustment parameter forms a sound with the desired property.

For example, the control unit ECU could comprise or store a library of pre-established sounds which can be emitted via the electrophone 25, where each sound of the library can be associated, in particular via the mapping, with the determined speed of the motor vehicle 1.

The control unit ECU thus controls the electrophone 25 so as to emit the sound of the library associated with the determined speed of the motor vehicle 1.

This sound of the library can possibly be an integrative sound, as already mentioned, in particular in the cases where the desired value is not attainable via the setting of the adjustment parameter. The attainability (also called controllability according to the control theory) is given by the relationship on which the control law is based, in particular the open-loop one.

In the latter case, for example, the control unit ECU could control the adjustment parameter for attaining the value of the variable closest to the desired value, whereas the sound of the library is configured to compensate the discrepancy or deviation or error between the latter values. Otherwise, regardless of the library, the control unit ECU could control the electrophone 25 for compensating the deviation; in fact, in particular, the control unit ECU could calculate or search for the closest attainable value of the variable with respect to the desired value via the control law, for example solving a problem of optimal control, i.e. via optimization (e.g. linear or non-linear programming, least squares methods, and the like), whereby in other words it can predict or know the discrepancy or deviation and consequently control the electrophone 25.

Therefore, the expression "closest value" is to be understood as the value which satisfies a pre-established optimization criterion as a function of the desired value (for example a minimization criterion of the square deviation between the searched value and the desired value).

In more general words, preferably, the control unit ECU is configured to determine an unacceptable condition, according to which the deviation exceeds an acceptable threshold, and to control the electrophone 25 in the case where the unacceptable condition occurs, so as to emit a corrective sound (e.g. directly the entire sound having the desired properties or the aforementioned integrative sound).

In any case, the corrective sound is adapted to reduce the deviation, in particular below the acceptable threshold.

For example, but not necessarily, the unacceptable condition could be an unattainability condition of the desired value via the control law (i.e. the variable is not controllable, according to the meaning of controllability in the control theory), i.e. where the attainable closest value with respect to the desired value has a deviation from the desired value greater than the acceptable threshold.

Here, the control unit ECU is configured to determine the unacceptable condition by predicting it while controlling or before controlling the adjustment parameter.

The prediction of the unacceptable condition occurs in particular by predicting or determining the unattainability condition (the control unit ECU determines or predicts that the deviation of the attainable closest value with respect to the desired value exceeds the acceptable threshold).

However, in the case where the electrophone 25 is controlled for emitting the integrative sound, the corrective sound is adapted to further reduce the deviation with respect to the reduction obtainable via the control of the adjustment parameter.

According to an embodiment, the control apparatus is configured to detect the actual value of the variable.

In particular, the control apparatus comprises a transducer 27, in particular comprising a microphone, configured to detect one or more magnitudes indicative of the actual value of the variable.

More specifically, the transducer 27 is coupled to the aerophone instrument 8 and is configured to detect one or more magnitudes indicative of the properties of the sound emitted by the aerophone instrument 8.

In this case, the microphone can detect the intensity and/or the frequency of the sound emitted by the aerophone instrument 8.

The control unit ECU is configured to determine the deviation from the detections of the transducer 27.

The control unit ECU acquires the magnitudes detected by the transducer 27, from which it determines the actual value of the variable, as well as the deviation between the actual value of the variable and the desired value of the variable.

Furthermore, preferably, the control unit ECU is configured to control the active device according to a closed-loop or feedback control law as a function of the determined deviation. In other words, the variable is controlled in feedback, i.e. utilizing the actual value determined by the control unit ECU.

The control law could, for example, comprise control blocks of proportional, proportional-integrative, or PID type with respect to the deviation. For example, the control law could be expressed in a classic manner or in the state space. For example, a state vector could include the length of the tubular body 9 (namely the position of the adjustment element 17 or of the actuator 18 thereof) and the opening degree of the valve 19 (namely the position of the valve 19 or of the actuator thereof). The state vector will be linked to the detections, which include at least the detection of the actual value of the variable, according to a relationship or model, for example obtainable experimentally or in analytical form.

Preferably, the active device comprises the actuators (the actuator 18 and the actuator of the valve 19) controllable for manipulating or controlling the relative adjustment parameters (the length of the tubular body 9 and the opening degree of the valve 19).

In turn, the properties of the sound emitted by the aerophone instrument 8 (the frequency and the intensity) are adjustable via the setting of the adjustment parameters.

Here, it is reminded that each actuator is not strictly necessary, whereby it could be absent, and also that not all of the properties of the sound have to necessarily be controlled via the setting of the relative adjustment parameters; in fact, also only one property could be controlled.

In the embodiment with the feedback control law, the control unit ECU is configured to control the active device according to the control law by controlling, for example independently, each adjustment parameter via the relative actuator as a function of the relative deviation.

Even in the latter embodiment, the control unit ECU is configured to determine the above-mentioned unacceptable condition, for example for a matter of unattainability of the desirable value or because the desired deviation remains beyond the threshold despite the feedback control law. The control unit ECU is configured to control the electrophone 25, such that the latter emits the already mentioned corrective sound.

Here, the active device is configured to control one or more adjustment parameters according to the control law for reducing the deviation.

The unacceptable condition can be determined after controlling the one or more adjustment parameters or by predicting the unacceptable condition (for example, as already previously explained, in particular for the unattainability condition) while controlling or before controlling the one or more adjustment parameters.

Here, optionally, the corrective sound is adapted for further reducing the deviation with respect to the reduction obtained or obtainable via the control of the one or more adjustment parameters.

As already explained, the corrective sound could be one of the sounds contained in the library of the pre-established sounds; alternatively, the control unit ECU could control the electrophone 25 for compensating the deviation.

Here, the control of the electrophone 25 could be part of the control according to the mentioned feedback control law. In other words, the corrective sound emitted by the electrophone 25 influences the deviation, thereby necessarily also influencing the feedback control law as a function of the deviation.

The control unit ECU could even control the electrophone 25 in closed loop, i.e. as a function of the deviation, in particular according to a further feedback control law.

Alternatively, the control unit ECU could control the electrophone 25 in open loop, as already previously discussed, despite the active device or more precisely the adjustment parameters are controlled with the feedback control law mentioned in the foregoing.

According to the embodiment of FIG. 10, the aerophone instrument 8 comprises a tubular body 9 with the end 10 arranged so as to be exposed to the forward wind, so as to be able to take in at least a portion of the forward wind.

The tubular body 9 comprises the adjustable element 17, so as to resonate as a function of the relative adjustment parameter and of one or more fluidodynamic properties of the taken in portion of the forward wind.

Furthermore, preferably, the aerophone instrument 8 comprises the valve 19 at the end 10, so that the control unit ECU can adjust the fluidodynamic properties (e.g. the flow rate or the speed) of the taken in portion.

The adjustable element 17 comprises the end 10*b*, which is closed so as to prevent the taken in portion from escaping through the end 10*b* and is movable along the axis A so as to alter the length of the tubular body 9, whereby the adjustment parameter comprises the length.

In this embodiment (FIG. 10), the control apparatus comprises sensors 28 configured to detect one or more magnitudes indicative of a pressure and of a speed (or flow rate) of the taken in portion, i.e. of the air flow inside the tubular body 9. The sensors 28 are configured to generate signals relative to the detected magnitudes. The control unit ECU is coupled to the sensors 28 and is configured to determine the pressure and the speed (or any other associated magnitude) from the signals generated by the sensors 28.

Furthermore, the control apparatus comprises the transducer 27.

Furthermore, the control apparatus comprises a transducer 29 configured to detect a magnitude indicative of the length of the tubular body 9 or of the position of the adjustment element 17 (i.e. of the end 10*b*). The transducer 29 is configured to generate a signal relative to the detected magnitude. The control unit ECU is coupled to the transducer 29 and is configured to determine the length of the tubular body 9 (or any other associated magnitude) from the signal generated by the transducer 29.

Here, the active device comprises the actuator 18.

The control unit ECU is preferably configured to control the actuator 18 in closed loop as a function of the length determined via the transducer 29, in particular as a function of a deviation between the determined length and the desired value of the adjustment parameter or in the broadest background of the feedback control law of the variable corresponding to the controlled property of the sound.

Furthermore, the control unit ECU is configured to control the valve 19, namely the actuator thereof, according to any one of the examples already previously discussed in this description.

The embodiment of FIG. 11 is similar to the one of FIG. 10, whereby the former will be described only for what distinguishes it from the latter utilizing the same reference symbols for the common or identical components.

In FIG. 11, the aerophone instrument 8 comprises a second tubular body 9.

The latter tubular body 9 is exposed as the other one to the forward wind and has, unlike the other one, the end 10*b* open, i.e. provided with an outlet opening for allowing the taken in portion of the forward wind to exit through the end 10*b*.

Specifically, the second tubular body 9 does not have the adjustable element 17.

The aerophone instrument has a further valve 19 at the end 10 of the second tubular body.

Independently, the control apparatus comprises a further transducer 27 for detecting one or more properties of the sound emitted by the second tubular body 9.

Furthermore, preferably, the control apparatus comprises the sensors 28 also for detecting one or more magnitudes indicative of a pressure and of a speed (or flow rate) of the portion taken in by the second tubular body 9.

An example of operation of the embodiment of FIG. 11 comprises the utilization of the active device for controlling the properties of the desired sound during an acceleration of the motor vehicle 1, i.e. during a transitory condition.

When the speed of the motor vehicle 1 is constant, the valve 19 of the first tubular body 9 is controlled by the control unit ECU for closing the end 10, whereas the end 10 of the second tubular body 9 is kept open. For example, the opening degree of the valve 19 of the second tubular body 9 can be controlled by the control unit ECU so that the intensity of the sound emitted by the aerophone instrument is increasing with the speed of the motor vehicle 1. The control can occur according to any one of the examples already described in this description with more generic terms.

When the control unit ECU receives the piece of information or indication of an acceleration of the motor vehicle 1, the control unit ECU controls the adjustment parameter relative to the valve 19 at the first tubular body 9 and/or the adjustment parameter relative to the adjustment element 17, such that the first tubular body 9 emits the same sound emitted by the second tubular body 9. In the latter control, the control unit ECU can utilize the further transducer 27 for determining the sound emitted by the second tubular body 9, thereby obtaining a sound emission target for the first tubular body 9. The sound emission target translates, in practice, in a desired value of the variable, whereby the control can be performed according to any one of the examples already described in this description.

At this point, the control unit ECU closes the end 10 of the second tubular body 9 via the relative valve 19.

Therefore, the control unit ECU follows the rise in speed of the motor vehicle 1 by controlling the active device, i.e. in particular the frequency and/or the intensity of the sound emitted by the first tubular body 9, as a function of the desired value obtained via the mapping. The control can occur according to any one of the examples already described.

In this manner, the control apparatus intervenes (i.e. controls the active device as a function of the desired value) in a more incisive manner only during the transitory conditions. If the speed of the motor vehicle 1 is stationary, the control apparatus may not intervene or intervene only on the valve 19 at the second tubular body 9.

The embodiment of FIG. 12 is similar to the one of FIG. 11, whereby the former will be described only for what distinguishes it from the latter utilizing the same reference symbols for the common or identical components.

In FIG. 12, the first tubular body 9 is replaced by the electrophone 25, in particular arranged inside the tubular body 30.

An example of operation of the embodiment of FIG. 12 could be similar to the one of the embodiment of FIG. 11, in which the operation of the first tubular body 9 is replaced by the one of the electrophone 25.

In particular, when the control unit ECU receives the piece of information or indication of an acceleration of the motor vehicle 1, the control unit ECU controls the electrophone 25, such that the electrophone 25 emits the same sound emitted by the second tubular body 9. In the latter control, the control unit ECU can utilize the further transducer 27 for determining the sound emitted by the second tubular body 9.

Furthermore, the control unit ECU follows the rise in speed of the motor vehicle 1 by controlling the electrophone 25 as a function of the desired value obtained via the mapping.

The control unit ECU can control the electrophone 25 according to any one of the examples already described in this description.

The embodiment of FIG. 13 is the combination of those of FIGS. 11, 12, with the electrophone 25 and the first tubular body 9 which cooperate together with the overall emission of the sound.

In addition to what described up to now, preferably, the control apparatus is configured to prevent the portion taken in by one, some or all of the tubular bodies 9 from being in a critical fluidodynamic state. The prevention occurs via a control of the corresponding valves 19.

The critical fluidodynamic state is defined by a plurality of pairs of magnitude values corresponding to the speed (or flow rate) and to the pressure of the taken in portion.

Figure 9:
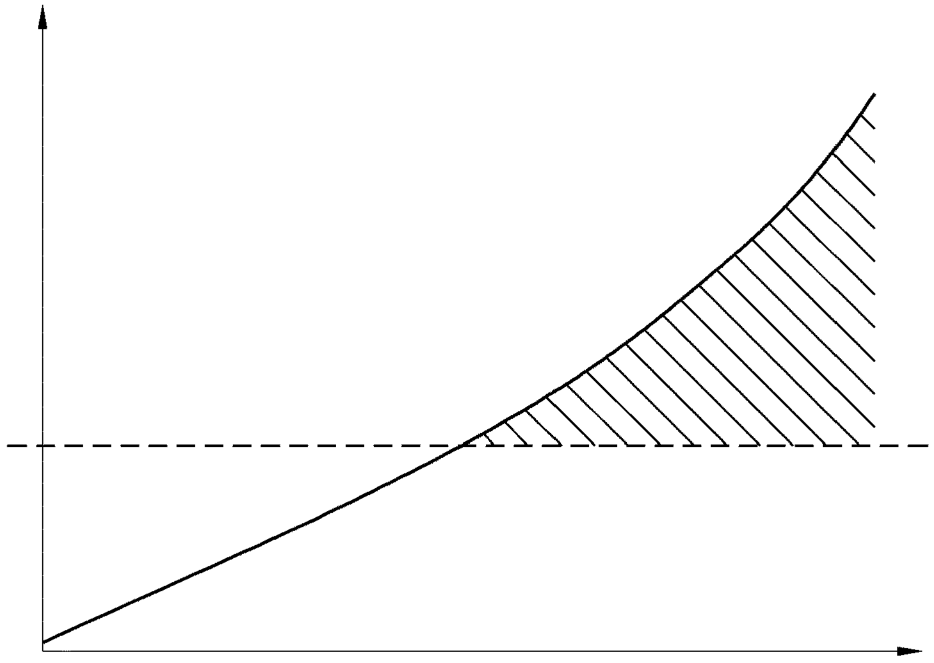
FIG. 9 is a graph representing a link between a speed and a pressure of an air flow through the pipe.

In particular, the critical fluidodynamic state is present for pressure and speed values respectively above corresponding critical thresholds, as is illustrated in FIG. 9 (the dashed area corresponds to the critical fluidodynamic state). FIG. 9 is a graph having an abscissa representing the speed (or flow rate) of the taken in portion and an ordinate representing the pressure.

The control unit ECU is configured to determine the critical fluidodynamic state via the signals generated by the sensors 28 (the control unit ECU determines the speed or flow rate and the pressure from the signals, thus determining whether the critical thresholds are both exceeded, i.e. if the critical fluidodynamic state occurs).

The control unit ECU is configured to control the valve 19 or the actuator thereof so as to decrease the opening degree when it determines the critical fluidodynamic state, until at least one between the pressure and speed values falls below the corresponding critical threshold (non-dashed area in FIG. 9). The falling of the values can be determined by the control unit ECU via the signals generated by the sensors 28.

The critical fluidodynamic state corresponds to a concrete risk of an attenuation phenomenon or disappearance of the intensity peak associated with the fundamental frequency, in favour of the higher frequencies (referred to as "octavation" in technical jargon), or even of a non-emission of sound via the tubular body 9 in which the critical fluidodynamic state occurs.

Figure 7:
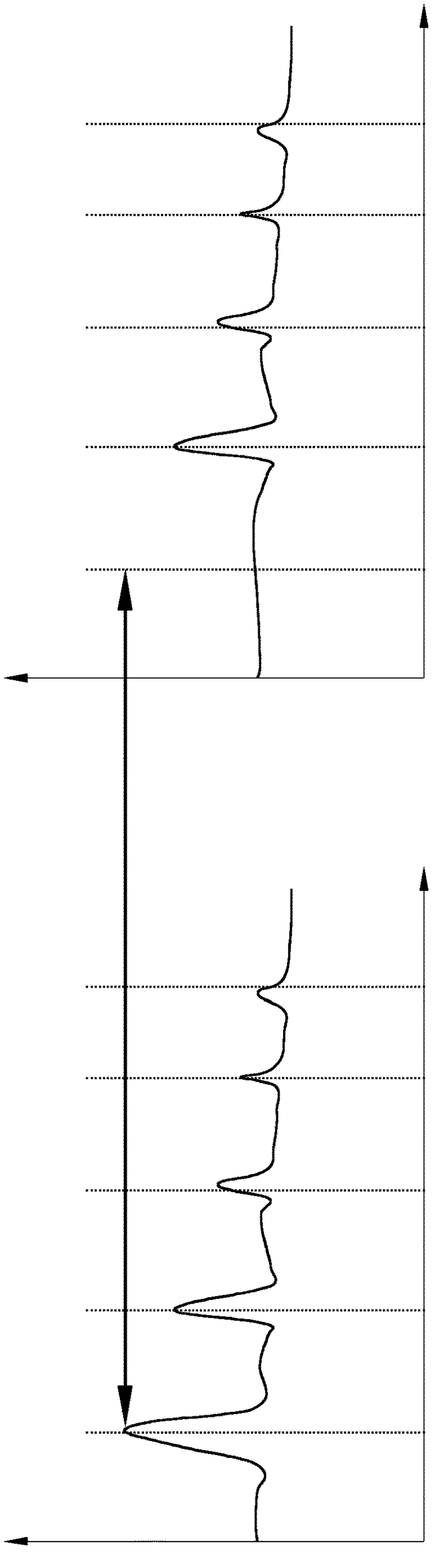
FIG. 7 depicts a change of the properties of the sound emitted by the pipe on the basis of the speed of the motor vehicle by means of a comparison between a first graph identical to the one of FIG. 3 and a second graph similar to the one of FIG. 3 but referring to a condition of greater speed of the motor vehicle.

FIG. 7 illustrates the octavation phenomenon. In practice, the intensity peak associated with the fundamental frequency disappears in an impulsive manner. This causes an unpleasant sound sensation incoherent with the rise in the speed of the motor vehicle 1.

Based on the foregoing, the motor vehicle 1 according to the invention has numerous advantages.

Firstly, the above-described motor vehicle 1 allows generating during the advancement a sound which is "pleasant" (namely, corresponding to the expectations of a driver of a motor vehicle, in particular a high-performance sports car), is substantially natural (i.e. is almost completely originated by physical phenomena which occur by effect of the motion of the motor vehicle 1 and varies autonomously upon the varying of the speed of the motor vehicle 1).

In particular, the sound generated by the motion of the motor vehicle 1 can vary, upon the varying of the forward speed of the motor vehicle 1, both as intensity and as frequency. Such variation can be controlled in a precise and repeatable manner via the active device and the control of the adjustment parameters of the adjustable elements, such as the valve 19 and the adjustable element 17.

The utilization of the electrophone 25 allows an additional improvement of the sound, since the electrophone 25 can integrate the sounds produced by the aerophone instrument 8, adding sounds otherwise unattainable.

Furthermore, the control unit ECU is capable of nullifying unpleasant phenomena such as the octavation thanks to the control of the valves 19.

The control apparatus can be utilized in an extremely versatile manner on the basis of the operating conditions of the motor vehicle 1.

In particular, also the tubular body 9 with the open end **10*b* has an advantageous role, as it simplifies the aerophone instrument 8 with an element almost totally passive, a part from the optional valve 19**.

Finally, the above-described motor vehicle 1 is simple and cost-effective to manufacture since the instrument 7 is not too bulky and can be housed in spaces normally free and not utilized (in a high-performance sports car). Also the manufacturing of the aerophone instrument 8 is all in all simple and cost-effective, since it is essentially about pipes with walls having small thickness (not having any structural function and having only to resist to the thrust of the forward wind).

Finally, it is clear that modifications and variations can be made to the motor vehicle 1 according to the invention which anyway do not depart from the scope of protection defined by the claims.

The invention claimed is:

1. A motor vehicle comprising a sound emitting instrument for emitting sound, the sound emitting instrument comprising:

an aerophone instrument arranged so as to be constantly invested by an aerodynamic flow corresponding to a forward motion of the motor vehicle, wherein the aerophone instrument is configured to emit at least part of said sound passively through the aerodynamic flow;

an active device configured to actively control at least one property of the sound; and a control apparatus comprising a mapping to associate a speed of the motor vehicle with a desired value of a variable corresponding to said property, the control apparatus being configured to:

determine the speed of the motor vehicle, determine the desired value of the variable by applying the mapping to the determined speed, and control the active device as a function of the desired value according to a control law to reduce a deviation between an actual value of the variable and the desired value.

2. The motor vehicle according to claim 1, wherein the control law is an open-loop control law based on a relationship between the variable and an adjustment parameter of an adjustable element of the aerophone instrument, whereby the desired value of the variable corresponds to a desired value of the adjustment parameter according to said relationship, wherein the active device comprises an actuator controllable to manipulate the adjustment parameter, wherein the control apparatus is configured to control the active device according to said control law by setting the desired value of the adjustment parameter via the actuator.

3. The motor vehicle according to claim 1, wherein the control apparatus is configured to detect the actual value of the variable and to determine said deviation, wherein the control law is a feedback control law as a function of said determined deviation.

4. The motor vehicle according to claim 1, wherein the active device comprises an electrophone provided with a loudspeaker and coupled to the control apparatus to be controlled by the control apparatus, wherein the control apparatus is configured to:

determine an unacceptable condition, according to which the deviation exceeds an acceptable threshold, and control the electrophone in case the unacceptable condition occurs, so that a corrective sound is emitted through the loudspeaker, the corrective sound being adapted to reduce the deviation.

5. The motor vehicle according to claim 4, wherein the active device is configured to control an adjustment parameter of an adjustable element of the aerophone instrument according to said control law to reduce the deviation, wherein the control apparatus is configured to determine the unacceptable condition after controlling the adjustment parameter or by predicting the unacceptable condition while controlling or before controlling the adjustment parameter, and wherein the corrective sound is adapted to further reduce the deviation from the reduction obtained or obtainable by controlling the adjustment parameter.

6. The motor vehicle according to claim 3, wherein the active device comprises an actuator controllable to manipulate an adjustment parameter of an adjustable element of the aerophone instrument, said property being adjustable by a setting of the adjustment parameter, and wherein the control apparatus is configured to control the active device according to said control law by controlling the adjustment parameter via the actuator as a function of the deviation.

7. The motor vehicle according to claim 2, wherein the aerophone instrument comprises at least one first tubular body, and wherein the first tubular body has a first end arranged to be exposed to the aerodynamic flow, so as to be able to take in at least a first portion of the aerodynamic flow, the first tubular body comprising said adjustable element so as to resonate according to the adjustment parameter and one or more fluidodynamic properties of the taken in first portion of the aerodynamic flow.

8. The motor vehicle according to claim 7, wherein the aerophone instrument comprises a first valve means at the first end, the control apparatus being configured to adjust the fluidodynamic properties of the taken in first portion by controlling the first valve means according to said control law, the first valve means being in turn configured to influence the fluidodynamic properties of the taken in first portion.

9. The motor vehicle according to claim 7, wherein the first tubular body extends along a first axis and has a second end opposite the first end according to the first axis and closed so as to prevent the taken in first portion of the aerodynamic flow from flowing out through the second end, the second end being part of the adjustable element and also being movable along the first axis so as to alter a length of the first tubular body along the first axis, and wherein said adjustment parameter comprises said length.

10. The motor vehicle according to claim 4, wherein the aerophone instrument comprises a second tubular body extending along a second axis, and wherein the second tubular body has a third end arranged so as to be exposed to the aerodynamic flow so as to be able to take in a second portion of the aerodynamic flow, and further has a fourth end opposite the third end according to the second axis and open to allow the taken in second portion to flow out of the second tubular body, the second tubular body being configured to resonate as a function of one or more fluidodynamic properties of the taken in second portion.

11. The motor vehicle according to claim 10, wherein the aerophone instrument comprises a second valve means at the third end, the control apparatus being configured to adjust the fluidodynamic properties of the taken in second portion by controlling the second valve means according to said control law, the second valve means being in turn configured to influence the fluidodynamic properties of the taken in second portion.

12. The motor vehicle according to claim 1, wherein said property comprises a fundamental frequency of the sound.

13. The motor vehicle according to claim 12, wherein said mapping associates the speed with the desired value according to an increasing continuous function.

14. The motor vehicle according to claim 13, wherein the increasing continuous function is linear.

15. The motor vehicle according to claim 1, wherein said property comprises a sound pressure intensity of the sound.

16. The motor vehicle according to claim 15, wherein said mapping associates the speed with the desired value according to an increasing continuous function.

17. The motor vehicle according to claim 16, wherein the increasing continuous function is linear.

18. The motor vehicle according to claim 1, wherein the mapping is stored in the control apparatus.

19. A motor vehicle comprising a sound emitting instrument configured to emit sound, the sound emitting instrument comprising:
- an aerophone instrument arranged so as to be invested by an air flow corresponding to a forward motion of the motor vehicle, wherein the aerophone instrument is configured to emit at least part of said sound passively through the air flow;
- an active device configured to actively control a property of said sound; and
- a control apparatus comprising a mapping to associate a speed of the motor vehicle with a desired value of a variable corresponding to said property, the control apparatus being configured to:
  - determine the speed of the motor vehicle,
  - determine the desired value of the variable using the mapping and the determined speed, and
  - control the active device as a function of the desired value according to a control algorithm to adjust a deviation between an actual value of the variable and the desired value of the variable.

20. A sound emitting instrument for use with a motor vehicle, the sound emitting instrument being configured to emit sound and comprises:
- an aerophone instrument arranged so as to be invested by an aerodynamic flow corresponding to a forward motion of the motor vehicle, wherein the aerophone instrument is configured to emit at least part of said sound through the aerodynamic flow;
- an active device configured to actively control a property of said sound; and
- a control system in communication with the active device, wherein the control system is adapted to:
  - determine the speed of the motor vehicle,
  - associate the determined speed of the motor vehicle with a desired value of a variable corresponding to said property of said sound, and
  - control the active device as a function of the desired value according to a control law to reduce a deviation between an actual value of the variable and the desired value of the variable.

* * * * *